United States Patent
Reineke et al.

(10) Patent No.: US 12,332,872 B2
(45) Date of Patent: Jun. 17, 2025

(54) DATA CONFIDENCE FABRIC POLICY-BASED SCORING

(71) Applicant: Dell Products L.P., Round Rock, TX (US)

(72) Inventors: Nicole Reineke, Northborough, MA (US); Stephen J. Todd, North Andover, MA (US); Trevor Scott Conn, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 58 days.

(21) Appl. No.: 17/652,225

(22) Filed: Feb. 23, 2022

(65) Prior Publication Data

US 2023/0267114 A1    Aug. 24, 2023

(51) Int. Cl.
G06F 16/23    (2019.01)

(52) U.S. Cl.
CPC ................ G06F 16/2365 (2019.01)

(58) Field of Classification Search
CPC .. G06F 16/2365; G06F 16/215; G06F 16/258; G06F 16/24573; G16Y 40/20
See application file for complete search history.

(56) References Cited

U.S. PATENT DOCUMENTS

| | | | |
|---|---|---|---|
| 11,099,835 B1 | 8/2021 | Wall et al. | |
| 11,513,772 B1 | 11/2022 | Gross | |
| 2009/0196485 A1 | 8/2009 | Mueller et al. | |
| 2018/0075194 A1 | 3/2018 | Allen et al. | |
| 2019/0103092 A1 | 4/2019 | Rusak et al. | |
| 2019/0228262 A1 | 7/2019 | Gonzalez et al. | |
| 2019/0303579 A1 | 10/2019 | Reddy et al. | |
| 2020/0287919 A1 | 9/2020 | Ravindranath et al. | |
| 2021/0014127 A1* | 1/2021 | Iyengar | H04L 41/12 |
| 2021/0303296 A1 | 9/2021 | Ahuja et al. | |
| 2022/0043711 A1* | 2/2022 | Shemer | G06F 9/45558 |
| 2022/0043721 A1 | 2/2022 | Shemer et al. | |
| 2022/0100858 A1 | 3/2022 | Todd | |
| 2022/0291921 A1 | 9/2022 | Balasubramanian et al. | |
| 2022/0335154 A1* | 10/2022 | Schuler | G06N 7/01 |
| 2022/0398308 A1 | 12/2022 | Zerah et al. | |
| 2023/0061701 A1* | 3/2023 | Shih | G06F 9/547 |

OTHER PUBLICATIONS

Todd, Project Alvarium: The Future of Edge Data, pp. 1-39 (Year: 2020).*
Todd, Information Playground: IoT Data Confidence Fabrics, pp. 1-3, May 30, 2019.*
Perez, Alvarium, pp. 1-2 (Year: 2021).*
Todd, Information Playground: Edge Data and Trust Insertion, pp. 1-3, Sep. 18, 2019.*
Todd, Enterprise Trust Insertion and IoT, pp. 1-2, Aug. 5, 2019.*
Lawton, The future of trust will be built on data transparency, pp. 1-10, Mar. 2021.*
Todd, Building the First Data Confidence Fabric, pp. 1-9 Oct. 2019.*

* cited by examiner

*Primary Examiner* — Albert M Phillips, III
(74) *Attorney, Agent, or Firm* — Workman Nydegger

(57) ABSTRACT

Generating policy-based confidence scores for data is disclosed. Data captured by a data confidence fabric is annotated when the data is created, mutated, transited or otherwise handled in the data confidence fabric. The annotations are weighted by a policy to generate policy-based confidence scores. The policy-based confidence scores are used in determining whether the data is sufficiently trusted for use by an application.

20 Claims, 4 Drawing Sheets

DATA CONFIDENCE FABRIC POLICY-BASED SCORING

FIELD OF THE INVENTION

Embodiments of the present invention generally relate to data confidence fabrics and to generating data confidence scores. More particularly, at least some embodiments of the invention relate to systems, hardware, software, computer-readable media, and methods for generating policy-based data confidence scores.

BACKGROUND

Computing and other electronic devices come in a variety of types and form factors and have varying capabilities. Many of these devices generate data that may be used by various applications. An application, however, may or may not have confidence or trust in the data coming from those devices or other sources. Applications that have confidence in the data being used typically generate more reliable results and outputs.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
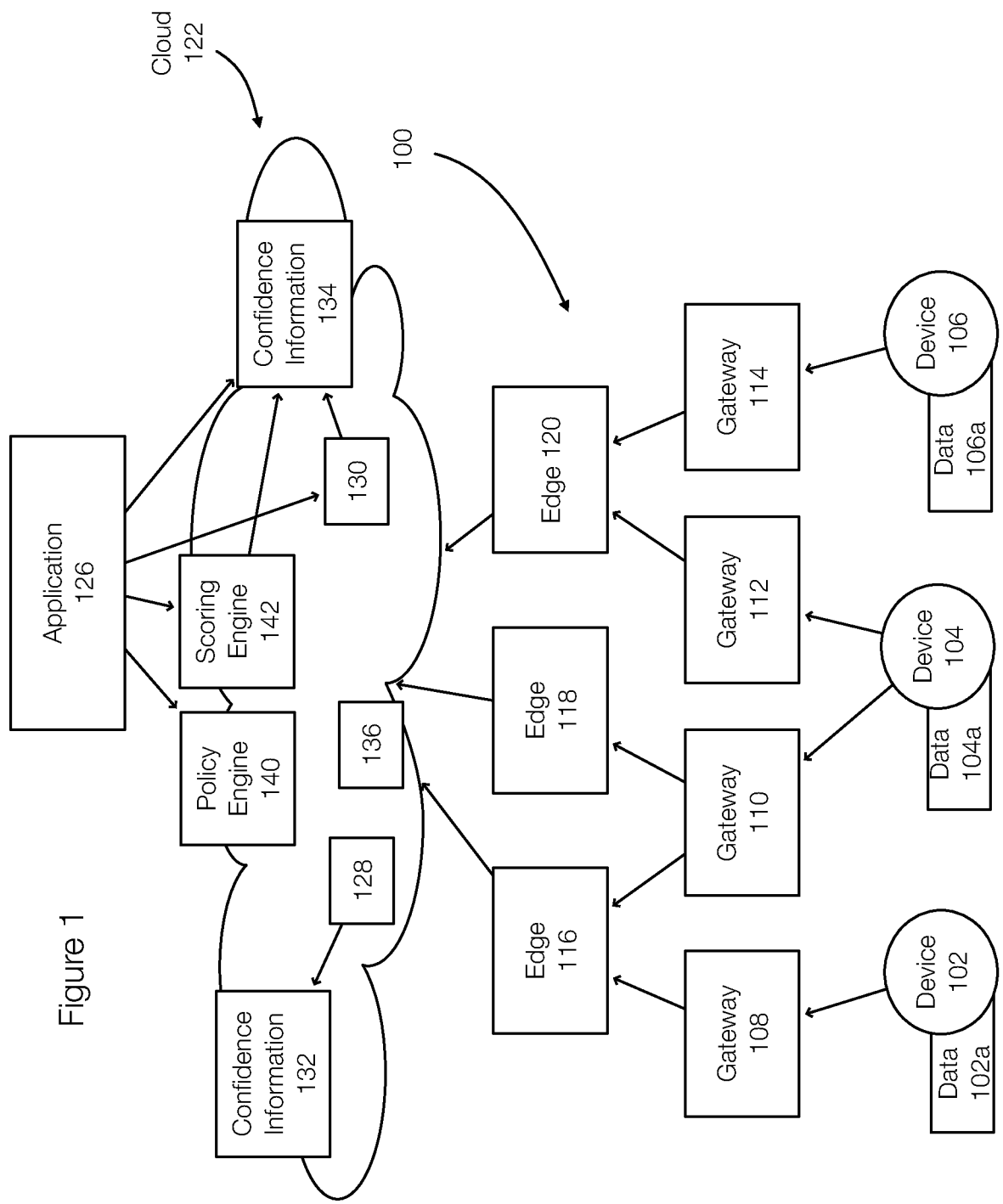
FIG. 1 discloses aspects of a data confidence fabric.

Embodiments of the present invention generally relate to computing systems or ecosystems such as data confidence fabrics (DCFs). In one example, a DCF is a system or collection of hardware (computers, servers, routers, network interface cards, storage including immutable storage and/or other hardware) that is provisioned (e.g., with software, services) to score or rank data that may be ingested into the DCF. The software or services itself may constitute a DCF that is installed into hardware.

The DCF is configured to route and score the data such that the data ingested into the DCF can be made available to applications, which may also be part of the DCF. As the data is routed or pathed, confidence or trust scores are added to the data by the various nodes involved in the flow of the data in the DCF. More specifically, the path or nodes may be associated with or include trust insertion technologies that insert trust into the data by generating annotations, which may include confidence scores. The trust inserted or associated with the data can be cumulative and may be weighted. The data is ultimately associated with a final confidence score that can be leveraged by applications that use the data.

Data that is handled by the DCF may be annotated. Annotations may be captured or generated when data is created, mutated, changed, transmitted, or the like from a source to a destination. These annotations may be used to generate a confidence score for the data. The final or overall data confidence score of a data is a combination of the annotations associated with the data by the DCF.

Embodiments of the invention relate to scoring the data in a policy-based or policy-driven manner. This allows the annotations (or specific data confidence scores), by way of example, to be weighted at the time of calculation to generate a final or overall data confidence score.

More specifically, the overall data confidence score can be determined in accordance with a policy. The policy may identify a specific way to weight the annotations or may identify other characteristics or considerations to be incorporated into the generation of the final confidence score. In addition, the policy used to generate the final data confidence score may be determined in accordance with desires of a user, based on use case, regulatory requirements, or the like or combination thereof. Multiple policies may be available, and embodiments of the invention may select specific policies for specific data. In addition, the policies or the policy definitions may have traceability such that the context for a given confidence score determination can be maintained and audited.

As data is routed in the DCF, the nodes may perform trust insertion or execute trust insertion technologies. Trust insertion includes, by way of example and not limitation, contributing a confidence or trust score to the data (e.g., by annotating a package including the data), performing a trust insertion technology on the data (e.g., authentication, data provenance, signatures, secure enclave computing, etc.), or the like or combination thereof. Embodiments of the invention are not limited to the trust insertion technologies identified herein.

A data confidence fabric, by way of example only, may relate to an architecture and set of services that allow data to be ingested into a system for use by applications. The DCF adds trust or confidence scores to the data as the data flows through the DCF. Combining all of the confidence scores added by the nodes or trust insertion technologies allows the ingested data to have an overall confidence score that provides a view into the trustworthiness of the data to an application or other user/consumer. Embodiments of the invention more specifically relate to a policy-driven data confidence score calculation. A policy driven approach allows the annotations to be weighted in accordance with the context or circumstance.

The data (and/or the annotations) scored or ranked in the DCF may be stored in various locations, such as a data lake, in a datacenter, a distributed ledger, a blockchain arrangement, a Public Cloud data storage service, or the like or combination thereof. The data scored or ranked in the DCF system can be made available to one or more applications or other clients or users.

Confidence scores allow an application to explore or exploit the data for potential analysis or consumption. The score or rank of the data allows an application to understand or account for the trustworthiness of the data. For example, the confidence score of the data may have a significant impact on whether the data is actually used by the application. An application may require a minimum confidence score or have other requirements related to the confidence score.

A DCF is able to give or associate data with scores from individual trust insertion technologies that can be combined in multiple ways to determine a final score or rank that relates to the trustworthiness of the data. The scores provided from a hardware perspective can be maintained separately from confidence scores from a software perspective. The scores can also be combined into an overall score.

For example, an application operating in a nuclear facility may need to use data that is very trustworthy (have a high confidence score) while data that is used by an application to control lights in a home may not need to be as trustworthy (a lower confidence score is acceptable).

In the context of a nuclear facility, an application may require that the hardware handling the data be firewalled from outside sources, provide hardware assisted encryption, deterministic routing, or the like or combination thereof. This can be reflected in the confidence score. Further, the policy may weight these trust insertions based on this particular use case. If any of these trust insertion technologies were not performed, the resulting score may reflect that certain trust insertions were not performed on the data. As trust insertions are performed on the data, the confidence score of the data generally increases and an application can place more trust in the data. The confidence score may not change or may decrease if certain trust insertions are not performed. In one example, certain trust insertions may have a negative weighting if not performed.

A policy-driven approach may allow data to be associated with different overall confidence scores. Two applications may have policies with different weights for the same trust insertion technologies. Policies allow applications to target specific data that may have received certain trust insertions. Policies also allow an application or user to value some trust insertions over other trust insertions.

The policy-based confidence score determination can be implemented in different ways. For example, a policy may be implemented via application configuration using a configuration file. The application can be configured to include or access a policy (e.g., an XML file) or the like. The policy may specify trust insertion technologies and corresponding weights.

In another example, a centralized policy engine may be implemented. The policy engine allows policies to be centralized. The policy engine may be associated with a scoring engine. The policy engine may be configured to perform policy management. This allows a user to upload policies, amend policies, delete policies, or the like. For example, the policy engine may provide an API (Application Programming Interface) that can be called by an application. The API allows an application or user to manage the policies stored by or at the policy engine.

The policy engine may store multiple policies for each user or application. For example, different classes or types of data may be associated with different policies. Policies may be differentiated based on the data, the user, the use case, regulatory rulings, or the like or combination thereof. The policy engine may provide an interface that allows multiple policies to be created and managed. Each policy may be uniquely identified or be associated with an identifier.

The scoring engine may generate policy-based confidence scores. When the scoring engine is called, a specific policy may be identified (e.g., using the policy identifier). The scoring engine can then access the annotations and generate a policy-based confidence score that is based on the identified policy. The scoring engine may apply the policy to the annotations to generate the policy-based confidence score. If necessary, the annotations may be processed or interpreted.

In one example, an identity of the caller may implicitly identify a specific policy or set of policies. In some examples, the scoring engine may generate policy-based confidence scores in advance for multiple policies. When called, the scoring engine may simply return the relevant policy-based scores. The API of the scoring engine may return the overall confidence score. The scoring engine may also return annotations and/or policy related information in some examples.

The policy engine allows policy decisions or applications to be separated from policy enforcement. The scoring engine can return a policy-based data confidence score using policies stored by the policy engine and the application can decide whether to use the data based on the policy-based confidence score. Further, a policy engine allows the confidence score generation to be updated for multiple applications at the same time. By updating the policy, any subsequent scores generated by the scoring engine use the criteria (e.g., weights) set forth in the updated policy.

FIG. 1 illustrates an example of a data confidence fabric (DCF 100). The DCF 100 includes various computing and hardware components, connections, and environments. The DCF 100 is configured to add confidence scores (e.g., as annotations) to data flowing in the DCF 100. The DCF 100 may include trust insertion technologies such as, but not limited to, ledgers, immutable storage, semantic validation, authentication, data provenance, TPM (Trusted Platform Modules) signatures, or the like or combination thereof.

FIG. 1 illustrates examples of data flows or paths in the DCF 100. A specific path of specific data may be referred to as a graph or route. The paths illustrated in FIG. 1 are not the only paths available in the DCF 100. Although FIG. 1 represents the DCF 100 in a hierarchical manner, the actual configuration may not be strictly hierarchical and may include peer-to-peer and mesh configurations.

In FIG. 1, data 102*a*, 104*a*, and 106*a* generated respectively by devices 102, 104, and 106 may flow through multiple levels or multiple hardware environments such as gateways 108, 110, 112, and 114, edges 116, 118, 120, and cloud 122. In one example, the data may be stored in the cloud 122. In this example, the data 128 represents the data 102*a* after being ingested and the data 130 represents the data 106*a* after being ingested into the DCF 100. The data 136 represents the data 104*a* after being ingested.

As the data 128, 130, and 136 flow through the DCF 100, the DCF 100 may add annotations such as provenance, trust metadata and/or scoring to the data. For example, after flowing through the DCF 100, the data 128 is stored in the cloud 122 and made available to an application 126. Similarly, the data 130 may be made available to the application 126. The data 128 is associated with confidence information 132 and the data 130 is associated with confidence information 134. The confidence information 132 and 134 may include, by way of example only, annotations such as confidence scores, provenance data, audit trails, data graphs, applied trust insertion technologies, successful and unsuccessful trust insertion attempts, or the like or other trust insertions. The confidence information 132 and 134 allows data to be audited to identify the path of the data in the DCF, which nodes applied what trust insertion technologies, or the like.

The policy engine 140 is available to the application 126 for policy management. The policy engine 140 may store a policy and may allow the policy to be changed, deleted, or the like. The policy engine 140 may store multiple policies for each of multiple applications or users.

The scoring engine 142 may be used to determine or calculate the overall confidence score of the data 130 based on a policy stored by the policy engine 140. The application 126 may call or use the scoring engine 142 when using or when determining whether to use the data 130. The scoring engine 142 may apply a policy to the confidence information 134 of the data 130 to generate a policy-based confidence score that the application 126 may use. The application 126 may determine to use only data that meets a threshold score.

The manner in which the policy-based confidence score is generated may depend on the format or content of the annotations included in the confidence information 134.

Figure 2:
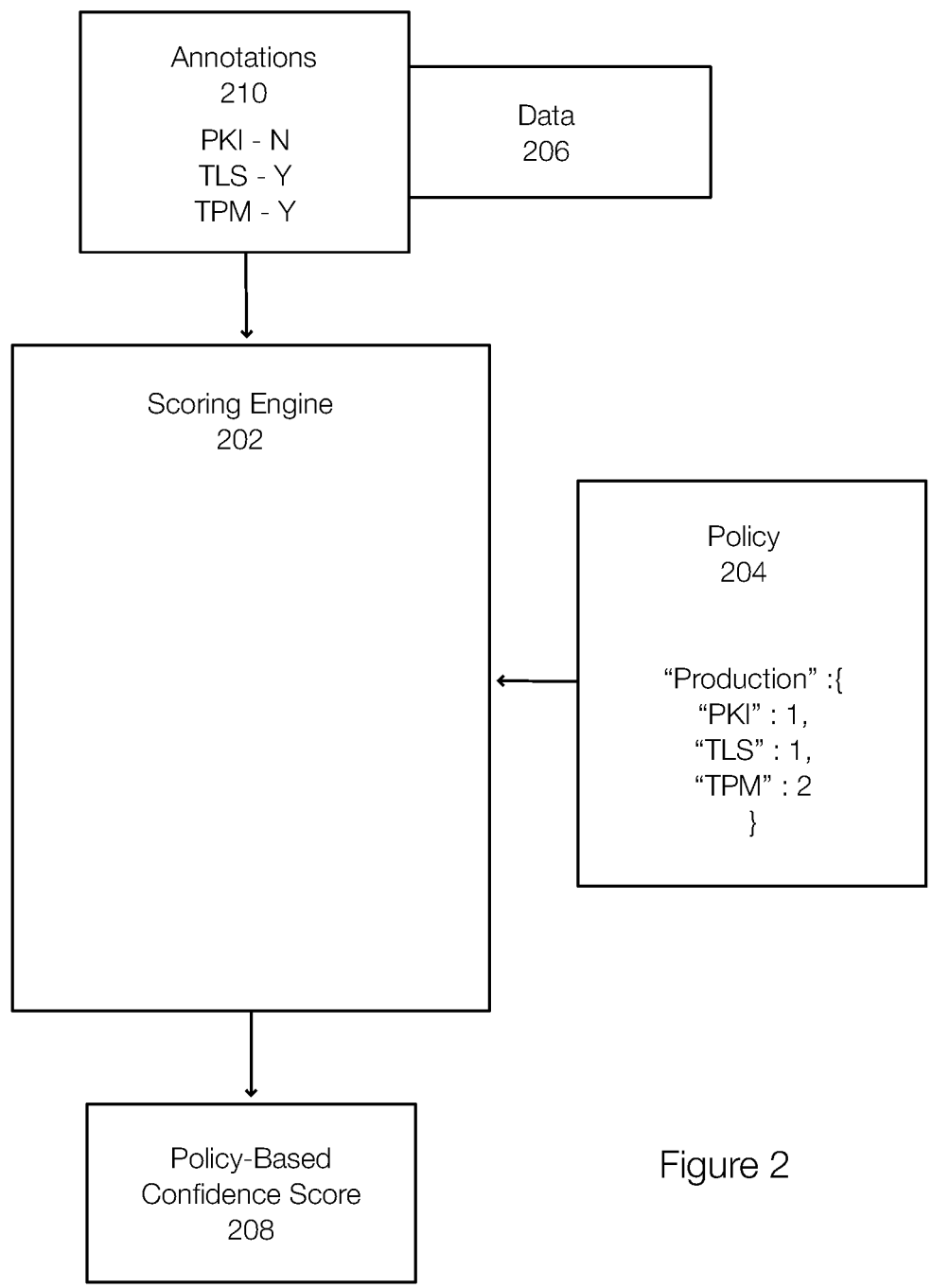
FIG. 2 discloses aspects of applying a policy to annotations applied to data ingested into a data confidence fabric.

FIG. 2 discloses aspects of generating a policy-based confidence score. In this example, an application may desire to use data 206. The data 206 is associated with annotations 210. In this case, the annotations 210 indicate which trust insertion technologies were performed or not performed. The annotations 210 are often the result of performing a trust insertion technology and are examples of trust insertion. According to the annotations 210 of the data 206, TLS (Transport Layer Security) was applied to the data 206, TPM (Trusted Platform Module) was also applied to the data 206, but PKI (Public Key Infrastructure) was not applied to the data 206.

The data 206 or the annotations 210 of the data 206 are accessed by the scoring engine 202 (or input to the scoring engine 202). The scoring engine 202, which is an example of the scoring engine 142, applies a policy 204. The scoring engine 202 may access the policy engine to obtain the policy 204. The policy 204 specifies weights for certain trust insertion technologies in this example. Specifically, TPM has a weight of 2, TLS has a weight of 1, and PKI has a weight of 1.

In one example, the weights may simply be added to determine the policy-based confidence score. Thus, the policy-based confidence score may be 3 in this example (e.g., out of 4). Alternatively, the weights may be applied to a base score, which may be included in the annotations 210. For instance, each of the trust insertion technologies (PKI, TLS, and TPM) may be associated with a confidence score of 10 in the DCF if performed and a score of 0 if not performed. Thus, the confidence score of the data 206 prior to applying the policy 204 may be 20. After applying the policy 204, the policy-based confidence score 208 is 30. There may or may not be a maximum confidence score. Alternatively, the maximum score for a specific policy may depend on the weights of that policy. Different policies may generate different policy-based confidence scores for the same data. In this example, the maximum confidence score for the policy 204 is 40.

If TPM was the only trust insertion applied to a data, the policy-based confidence score 208 would be the same (20) as for data that received only PKI and TLS trust insertions.

For example, an IoT (Internet of Things) provider may seek to provide value to their customers by scoring all device data transiting through their system, which is provisioned to include a DCF. As illustrated in FIG. 2, the provider may decide to weight the existence of a TPM chip in order to securely manage cryptographic secrets above other trust insertion technologies, as illustrated by the policy 204. Another provider may generate a different policy for the same trust insertion technologies.

In a multi-tenant situation, each tenant may provide their own policy. Plus, as previously stated, the policy may be implemented at the application level using a configuration policy file for example or using a policy engine.

In one example, this allows scoring to be performed after the data has been ingested by the DCF. Once data is ingested and stored, the scoring engine 202 may iterate over the data and/or the data's annotations and apply the policy to generate the policy-based confidence score. Policy-based confidence scores generated in this manner can be similarly stored. These scores and annotations may be stored in a ledger.

The policy 204 further illustrates that the policy is for a production environment. Policies can be set differently based on the execution environment, the host, the class of machines, the context, or the like. A policy for a test environment may differ from a policy for a production environment.

In another example, the annotations 210 may have different values notwithstanding weighting. The annotations, instead of identifying which trust insertions were performed and which were not performed, may also provide a score. The score may be based on characteristics of the trust insertion technology. For example, the score of TPM chips from one manufacturer may differ from the score of another manufacturer. The score of TPM chips that are older or that may have an outdated firmware version (where applicable) may receive a different score.

The policy 204 may also be more nuanced and complex and may account for other annotations such as manufacturer, firmware version, or the like of the trust insertion technologies. The scoring engine 202 is configured to interpret the annotations, regardless of type, and generate a corresponding score and/or weighted score. In one example, the scoring engine 202 generates a score for each trust insertion technology represented in the annotations 210, applies the weights to the individual confidence scores, and then combines the scores to generate the policy-based confidence score. Other methods may be implemented to generate these confidence scores.

However, a policy configuration file or a centralized policy engine allow changes in the weights to be performed centrally rather than requiring each node of the DCF to be updated individually. Updating a policy at a policy engine may be easier and more efficient than updating each node of a DCF with the new policy.

Figure 3:
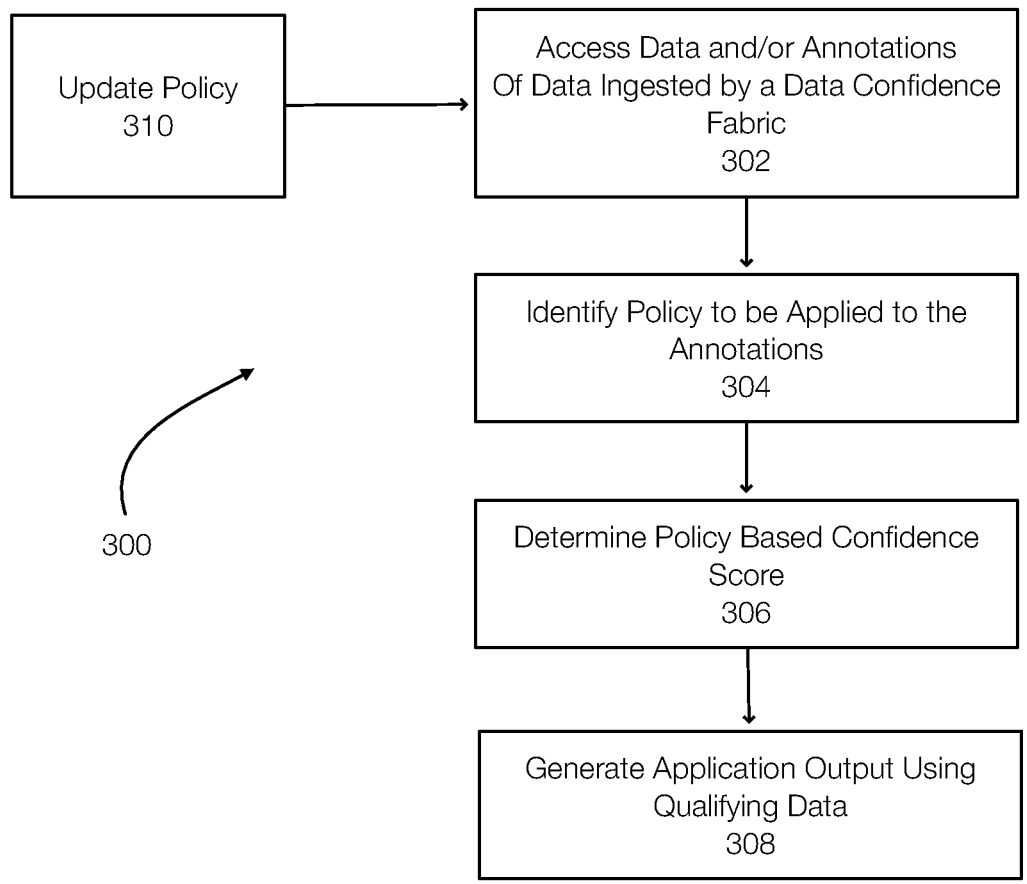
FIG. 3 discloses aspects of generating a policy-based confidence score.

FIG. 3 discloses aspects of determining and/or using policy-based confidence scores. The method 300 may begin by accessing 302 data and/or annotations of data that has been ingested by a data confidence fabric. The data and/or annotations may be identified by an application desiring to use the data in one example. For example, an application may identify a set of data from sensors configured to collect wind speed measurements or, more generally, weather related measurements.

Next, the policy to be applied to the data and/or annotations is identified 304. The policy to be applied to the annotations may depend on the application, the execution environment, or other factor or characteristic. The policy may include a method for applying weights to the annotation data or may specify weights. The policy may include code that allows the confidence score to analyze the annotations and output a confidence score.

Next, the policy-based confidence score is determined 306 by applying the policy to the annotations and/or data. The policy-based confidence scores may be generated by the scoring engine, which may iterate over the identified data. Alternatively, policy-based confidence scores may have been precomputed by applying various policies and the relevant confidence scores are simply returned. The policy-based confidence score may be used by an application to generate 308 an output. More specifically, the application may only use qualifying data (e.g., data that meets a threshold policy-based confidence score).

At times, the policy may be updated 310. If a policy is updated, prior calculations may be refreshed. This obviates the need to redeploy applications when the policy changes. Rather, it is only necessary to change the policy.

Embodiments of the invention improve the operation of a computing system by improving the trust in the data consumed by the computing system and/or improving the trust in the output of the computing system. The operation of the machine or application is improved by operating with higher quality data. Further, the policy-based confidence score represents transformations that were performed on the data (e.g., encryption, security procedures, signing, or the like).

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data confidence operations such as policy-based score determination/calculation operations, policy deployment operations, data confidence fabric operations, or the like or combination thereof.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, virtual machines (VM), or containers.

Particularly, devices in the operating environment may take the form of software, physical machines, VMs, containers, or any combination of these, though no particular device implementation or configuration is required for any embodiment.

The various components, modules, engines, or the like may be servers, clients, laptops, computers, tablets, or the like. A data confidence fabric may be implemented in various networks including local area networks, wide area networks, cellular networks, or the like or combination thereof.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. Data may also include sensor data, IOT data, application outputs, time series data, or the like.

Example embodiments of the invention are applicable to any system capable of storing and handling various types of objects, in analog, digital, or other form. The principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: ingesting data into a data confidence fabric, performing trust insertions on the data as the data traverses the data confidence fabric, wherein each of the trust insertions results in an annotation associated with the data, applying a policy to the annotations, wherein the policy identifies weights to be applied to the annotations, and generating a policy-based confidence score for the data.

Embodiment 2. The method of embodiment 1, wherein the trust insertions include one or more of trusted platform modules, ledgers, immutable storage, public key infrastructure, transport layer security, signatures, and encryption.

Embodiment 3. The method of embodiment 1 and/or 2, further comprising storing the data and the annotations in a ledger.

Embodiment 4. The method of embodiment 1, 2, and/or 3, further comprising managing the policy with a policy engine, wherein the policy engine facilitates creating the policy, updating the policy, and deleting the policy.

Embodiment 5. The method of embodiment 1, 2, 3, and/or 4, further comprising applying the policy, by a scoring engine that stores the policy.

Embodiment 6. The method of embodiment 1, 2, 3, 4, and/or 5, further comprising calling the scoring engine to execute the policy stored in a policy engine on the data.

Embodiment 7. The method of embodiment 1, 2, 3, 4, 5, and/or 6, further comprising updating the policy a single time for all trust insertions in the data confidence fabric.

Embodiment 8. The method of embodiment 1, 2, 3, 4, 5, 6, and/or 7, further comprising applying the policy to all data ingested into the data confidence fabric after the data is ingested in a batch process.

Embodiment 9. The method of embodiment 1, 2, 3, 4, 5, 6, 7, and/or 8, further comprising updating the policy-based confidence score after updating the policy.

Embodiment 10. The method of embodiment 1, 2, 3, 4, 5, 6, 7, 8, and/or 9, further comprising selecting the policy from among a plurality of policies based on one or more of an execution environment, a host, a class of machine, a context, or combination thereof.

Embodiment 11. The method of embodiment 1, 2, 3, 4, 5, 6, 7, 8, 9, and/or 10, wherein the execution environment is one of a production environment or a test environment.

Embodiment 12. The method of embodiment 1, 2, 3, 4, 5, 6, 7, 8, 9, 10, and/or 11, wherein the policy comprises an application based configuration file that is applied to the annotations associated with the data.

Embodiment 13. A method for performing any of the operations, methods, or processes, or any portion of any of these, or any combination thereof disclosed herein.

Embodiment 14. A non-transitory storage medium having stored therein instructions that are executable by one or more hardware processors to perform operations comprising the operations of any one or more of embodiments 1-13.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
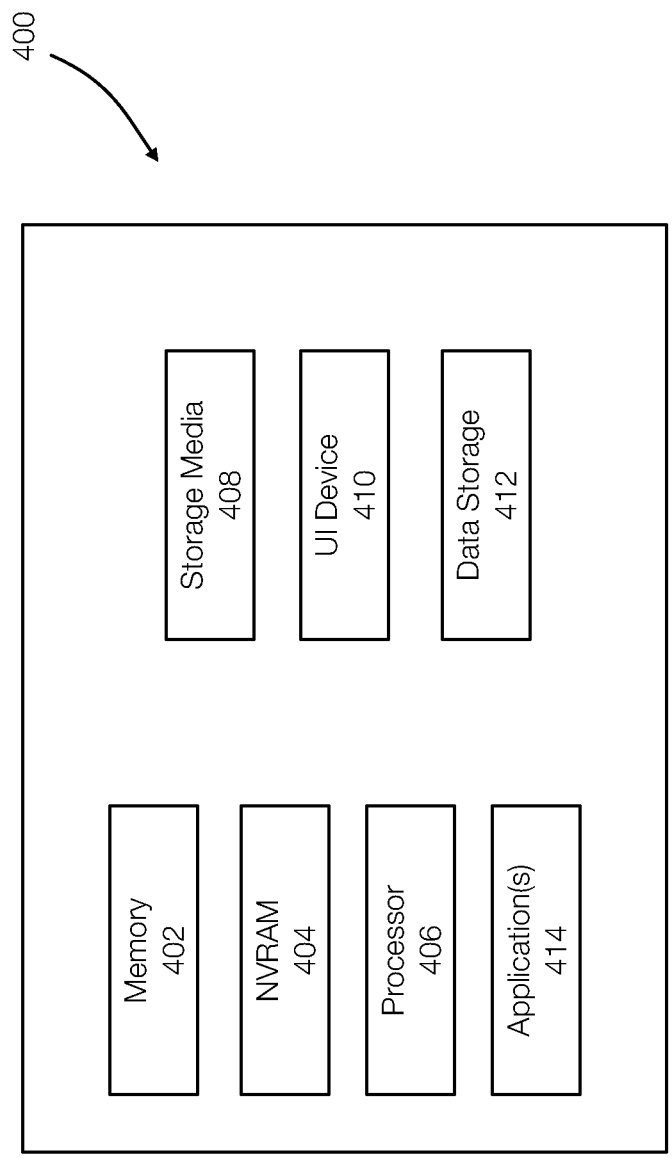
FIG. 4 discloses aspects of a computing device or environment.

With reference briefly now to FIG. 4, any one or more of the entities disclosed, or implied, by Figures, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random-access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid-state device (SSD) storage. As well, one or more applications 414 may be provided that comprise instructions executable by one or more hardware processors 406 to perform any of the operations, or portions thereof, disclosed herein. The physical device 400 may also represent the hardware of a computing system, a network-based system, or the like.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
ingesting data into a data confidence fabric;
performing trust insertions on the data as the data traverses the data confidence fabric, wherein each of the trust insertions results in an annotation associated with the data;
generating, by a policy engine, a set of policies, wherein each policy is associated with a separate application, and wherein each policy identifies weights to be applied to the annotations, wherein at least two of the policies have different weights for the same annotations;
selecting, by a scoring engine, a policy within the set of policies from the policy engine based on the application that is to use the data;
applying the policy to the annotations, wherein applying the policy includes applying the weights to the annotations;
generating, by the scoring engine, a confidence score for each trust insertion technology represented in the annotations;
applying, by the scoring engine, weights to the individual confidence scores according to the selected policy; and
generating, by the scoring engine, a policy-based confidence score for the data based on a combination of the individual weighted confidence scores, wherein an application accesses the data associated with the individual weighted confidence scores and generates an output using only data whose policy-based confidence scores exceed a threshold score.

2. The method of claim 1, wherein the trust insertions include one or more of trusted platform modules, ledgers, immutable storage, public key infrastructure, transport layer security, signatures, and encryption.

3. The method of claim 1, further comprising storing the data and the annotations in a ledger.

4. The method of claim 1, further comprising managing the policy with the policy engine, wherein the policy engine facilitates creating the policy, updating the policy, and deleting the policy.

5. The method of claim 1, further comprising applying the policy, by the scoring engine that stores the policy.

6. The method of claim 5, further comprising calling the scoring engine to execute the policy stored in a policy engine on the data.

7. The method of claim 6, further comprising updating the policy a single time for all trust insertions in the data confidence fabric.

8. The method of claim 6, further comprising applying the policy to all data ingested into the data confidence fabric after the data is ingested in a batch process.

9. The method of claim 6, further comprising updating the policy-based confidence score after updating the policy.

10. The method of claim 1, further comprising selecting the policy from the set of policies based on one or more of an execution environment, a host, a class of machine, a context, or combination thereof.

11. The method of claim 10, wherein the execution environment is one of a production environment or a test environment.

12. A non-transitory storage medium having stored therein instructions that are executable by one or more hardware processors to perform operations comprising:
ingesting data into a data confidence fabric;
performing trust insertions on the data as the data traverses the data confidence fabric, wherein each of the trust insertions results in an annotation associated with the data;
generating, by a policy engine, a set of policies, wherein each policy is associated with a separate application, and wherein each policy identifies weights to be applied to the annotations, wherein at least two of the policies have different weights for the same annotations;

selecting, by a scoring engine, a policy within the set of policies from the policy engine based on the application that is to use the data;

applying the policy to the annotations, wherein applying the policy includes applying the weights to the annotations;

generating, by the scoring engine, a confidence score for each trust insertion technology represented in the annotations;

applying, by the scoring engine, weights to the individual confidence scores according to the selected policy; and generating, by the scoring engine, a policy-based confidence score for the data based on a combination of the individual weighted confidence scores, wherein an application accesses the data associated with the individual weighted confidence scores and generates an output using only data whose policy-based confidence scores exceed a threshold score.

13. The non-transitory storage medium of claim 12, wherein the trust insertions include one or more of trusted platform modules, ledgers, immutable storage, public key infrastructure, transport layer security, signatures, and encryption.

14. The non-transitory storage medium of claim 12, further comprising storing the data and the annotations in a ledger.

15. The non-transitory storage medium of claim 12, further comprising managing the policy with the policy engine, wherein the policy engine facilitates creating the policy, updating the policy, and deleting the policy.

16. The non-transitory storage medium of claim 12, further comprising applying the policy, by the scoring engine that stores the policy.

17. The non-transitory storage medium of claim 16, further comprising calling the scoring engine to execute the policy on the data.

18. The non-transitory storage medium of claim 17, further comprising updating the policy a single time for all trust insertions in the data confidence fabric.

19. The non-transitory storage medium of claim 17, further comprising applying the policy to all data ingested into the data confidence fabric after the data is ingested in a batch process.

20. The non-transitory storage medium of claim 12, further comprising selecting the policy from the set of policies based on one or more of an execution environment, a host, a class of machine, a context, or combination thereof.

* * * * *